Sept. 1, 1936.    A. W. GARDES    2,052,616
KEY AND METHOD OF MANUFACTURING THE SAME
Filed Dec. 27, 1932
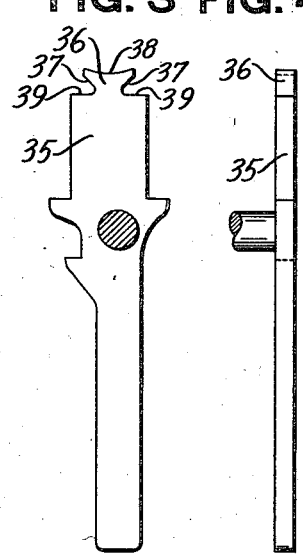
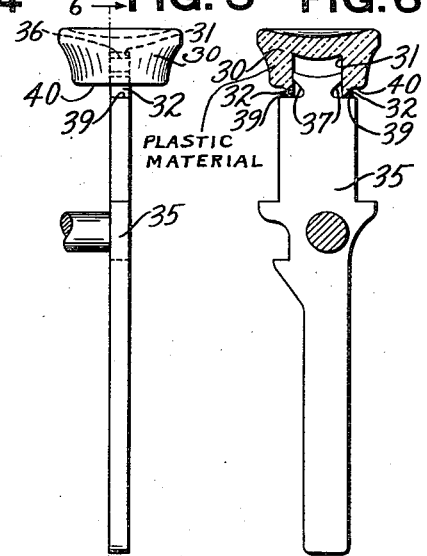
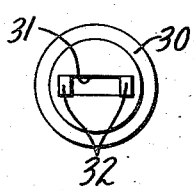
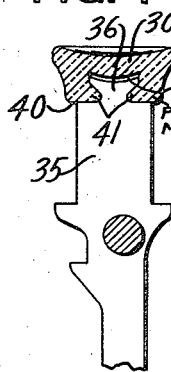
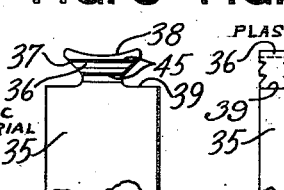
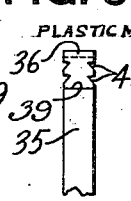
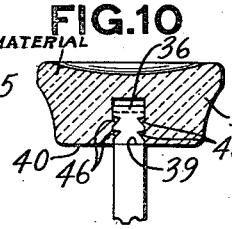
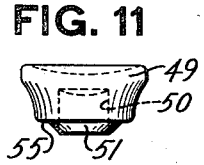
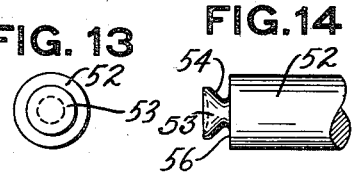
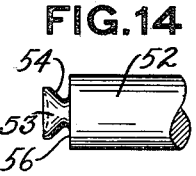
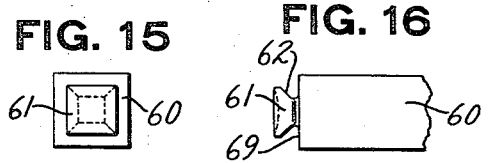
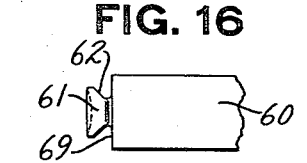
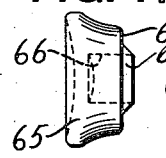
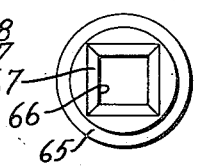
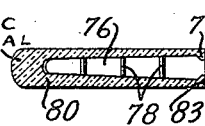
Inventor
Alfred W. Gardes
By
Karl Beust
His Attorney Patented Sept. 1, 1936

2,052,616

UNITED STATES PATENT OFFICE 2,052,616

KEY AND METHOD OF MANUFACTURING THE SAME

Alfred W. Gardes, Dayton, Ohio, assignor to The National Cash Register Company, Dayton, Ohio, a corporation of Maryland Application December 27, 1932, Serial No. 648,911

6 Claims. (Cl. 18—59)

This invention relates to improvements in the process of manufacturing keys used on cash registers, calculating machines, typewriters, or any other machine where keys are used.

The process as described and the article illustrated, relate particularly to what are known in the art as "calculating machine or cash registers keys".

In cash registers, calculating machine and typewriters, the keys are usually comprised of a key stem or lever of metal and a key tip or fingerpiece made of a plastic material, such as cellulose nitrate or cellulose acetate.

In the past manufacturers of calculating machines and cash registers have had considerable difficulty in holding the key tips or fingerpieces on the keys after the machines are out in use. It appears that by constant use the tip will become loosened and can be easily pulled off from the key, which condition is quite objectionable as it has the effect of making very uneven keyboards, that is, some key tips will stand higher than others.

It is, therefore, an object of this invention to produce a process or method of manufacture for keys having a metal stem and a key tip made from plastic material which method permits of the assembling of the key tip onto the key stem in such a manner as to produce a unitary structure whereby the key tip or fingerpiece cannot be pulled off from the key stem or lever after they have been assembled by applicant's novel process.

Another object of this invention is the production of a process or method, whereby a portion of a previously molded key tip may be softened or plasticized and assembled on a metal stem or lever without destroying or affecting the top or sides of the key tips.

Another object of the present invention is to produce a process or method of manufacturing an article comprised of a metal stem and a tip made of plastic material, whereby a certain portion of the previously solidified tip may be reduced to a state of plasticity through the application of heat from the metal stem so that the plasticized or softened portion of the tip will assume the contour of that portion of the metal stem or lever inserted therein to produce a unitary structure when the plasticized portion of the tip again solidifies.

Another object of the present invention is the production of a process or method the use of which is not limited to a process or method the use of which is not limited to the specific types of work shown and described as it is readily susceptible of use for the production of many other types of articles comprised of a metal element and an element made of plastic material.

Many types of tools, such as screw drivers, knives, etc., may be made with handles of plastic material. Such handles may be molded and carried in stock separately from the working part of the tool, and by the use of applicant's novel process, such previously molded handles may have certain specified portions thereof softened sufficiently to cause the material to "flow" under a comparatively light pressure whereby they can be readily joined with metal tools to form a completed novel article.

Another object of the present invention is the production of a specially designed key tip adapted particularly for assembling on a key stem or lever by the hereinafter described novel method.

Another object of this invention is to so design a key tip that when the same is assembled, by applicant's novel process, the tops of the key tips will always be substantially the same height from any given point on the key stem.

Another object of the present invention is to so design the key tip or fingerpiece that it may be readily assembled by applicant's novel method upon key stems having various shapes and designs, without in any way departing from the spirit of this invention.

A further object of this invention is the production of a process or method of manufacturing an article comprised of a metal element and a pre-molded element made of plastic material, whereby a certain portion only of the pre-molded element is plasticized or softened so that when the two elements are assembled, the unsoftened portion of the pre-molded element will act as a die to force the proper "flowing" or "drifting" of the softened portion to insure that the two elements are properly and securely joined.

With these and incidental objects in view, the invention includes certain novel features of construction and combination of parts, the essential elements of which are set forth in appended claims, and a preferred form of embodiment of which is hereinafter described with reference to the drawing which accompanies and forms a part of this specification.

Of said drawing:

Fig. 1 is a side view of a key tip showing the substantially triangular-shaped projections on the bottom thereof, adjacent the recess in the key tip.

Fig. 2 is a bottom view of the key tip.

Fig. 3 is a side view of a key stem showing its dovetail tenon or pilot.

Fig. 4 is an edge view of the key stem of Fig. 3.

Fig. 5 shows the dovetail pilot of the key stem partially inserted in the recess of the key tip.

Fig. 6 is a section taken on line 6—6 of Fig. 5 and shows the dovetail pilot of the key stem inserted in the key tip until the projections on the key tip strike the shoulder of the key stem.

Fig. 7 is a view taken alongside of the key stem and through the key tip after the key stem has been fully inserted in the recess in the key tip, and shows clearly how the plasticized or softened projections are forced into the undercuts of the tenon on the key stem during the time the key stem is pushed from the position shown in Fig. 6 upwardly until the bottom of the key tip strikes the shoulders of the key stem.

Fig. 8 is a side view of the upper end of the key stem showing how the tenon or pilot may be further scored or recessed to receive the "flow" of the plasticized portion of the key tip.

Fig. 9 is an edge view of the key stem shown in Fig. 8.

Fig. 10 is a sectional view showing how the plasticized or softened portion of the key tip flows into the scores or recesses on the side of the key stem pilot shown in Figs. 8 and 9.

Fig. 11 is a side view of a modified form of key tip having a circular recess and a circular flange in place of the two projections shown in Fig. 1.

Fig. 12 is a bottom view of the modified form of key tip shown in Fig. 11.

Fig. 13 is an end view of a cylindrical stem adapted to be used in connection with the key tip shown in Figs. 11 and 12.

Fig. 14 is a side view of a portion of a cylindrical key stem shown in Fig. 13.

Fig. 15 is an end view of a square key stem.

Fig. 16 is a side view of a portion of the key stem shown in Fig. 15.

Fig. 17 is a side view of a key tip adapted to be used on the key stem shown in Figs. 15 and 16.

Fig. 18 is a bottom view of the key tip shown in Fig. 17.

Fig. 19 illustrates another type of article which may be made by applicant's novel process.

Fig. 20 shows one type of handle for an article of the nature shown in Fig. 19.

*General description*

In some manufacturing industries, especially in the cash register, calculating machine, and typewriter arts where they use keys comprised of metal stems or levers with tips or fingerpieces made of plastic material, considerable difficulty has been experienced due to the fact that the key tips become loosened from the key stems or levers and often become lost after the machines have been in use for a period of time.

In many cases the key tips were assembled on the stems by gluing the parts and also having a tight fit between the tip and the stem. Many times, even though the key tips did not come off, they would become loosened and out of alinement and thus make an unsightly keyboard especially where several of them were loosened and stood at various angles and heights.

Other means have been used to assemble the key tips to the key stems, such as providing a fork on the bottom of the key tip which straddles the key stem. In some cases each key tip is provided with a tenon which is inserted in a form made in the upper end of the key stem, after which the key stem and tip were pinned together.

This latter manner of assembling, while it did hold the key tips on the key stems, was not altogether satisfactory because of the cost in production, and sometimes even the pins which held the two parts together would become loosened and finally work out, after which the tips would, due to usage, become tilted at various angles and often come off.

In other cases the tips were pinned on the stems by putting the pins through the main body of the tips.

With the above difficulties in mind, applicant set out to develop a new key tip and to devise ways and means of assembling the tips to the key stems so that the above disadvantages and objections would be eliminated.

The hereinafter described novel key tips and the economic and effective method of assembling the same on metal key stems have been invented by applicant in view of his study of the many difficulties and objections previously encountered.

In the preferred form the key tip, which is made of plastic material, is formed with a recess in the bottom thereof and has two projections adjacent such recess. The key stem is made with a tenon or pilot having undercut sides and has the general formation of what is known as a dovetail. It is to be distinctly understood that the sizes and shapes of the key tips and key stems may be varied to suit conditions arising from various cases without departing from the broad invention.

The simple but novel, economic and effective method of manufacturing the hereinafter described key consists of the step of first heating the key stem to a predetermined temperature, then inserting the pilot or tenon thereon into the recess in the key tip, then retaining the key tip and key stem in such relationship for a predetermined time, which is sufficient to cause the heat from the key stem to plasticize or soften the projections on the tip and also the central portion of the key tip immediately surrounding the recess, and finally fully inserting the tenon in the key tip. Due to the fact that the outer and major portion of the key tip is still in a hard condition, said tip therefore acts as a die and causes the placticized projections to flow into the undercut recesses of the key tenon or pilot, thus completely filling up those recesses and permanently locking or keying the key tip to the key stem.

The assembled key is then allowed to cool, during which time part of the tip which has been previously softened or reduced to a state of plasticity, and filled up all of the undercut recesses solidifies, thus forming a unitary key.

One of the main and important features of the present process of assembling the key tip to the key stem in the manner above stated is that the tops of the key tips are all a uniform distance from the bottoms or some other designated working points of the keys. This of course insures a uniform keyboard wherein the key tips are all the same height from the cabinets or covers of the machines when used in calculating machines or cash registers.

When applicant's novel process is used to assemble articles of the nature illustrated in Fig. 19, or small tools such as screw drivers etc., the shank or tenon is heated, then inserted in the handle of plastic material and the two parts are then maintained in such relationship until the heated shank has plasticized or softened the projection or flange, as the case may be, and a portion of the interior of the handle, after which the shank is further inserted into the handle until a shoulder on the main body of the article forces the softened sections of the handle into recesses in the shank thus keying the two parts permanently together.

*Detailed description*

The new process or method for producing uniformly assembled keys comprised of a tip of plastic material and key stem or lever of metal, will now be described in detail, referring particularly to Figs. 1 to 7 inclusive.

Figs. 1 and 2 disclose respectively side and bottom views of a key tip of the preferred form made of a plastic material such as cellulose nitrate or cellulose acetate. It is, however, to be distinctly understood that the key tip may be made of other kinds of plastic materials without in any way departing from the spirit or scope of this invention.

This key tip 30, shown for illustrative purposes, is provided with a rectangular-shaped recess 31 and has two substantially triangular-shaped projections 32, which are the width of the recess 31. The vertical edges of the projections 32 form continuations of the ends of the recess 31. The recess 31 has a slightly convexed surface 33 to provide a comparatively thick wall between the bottom of the recess and the concaved surface 34 of the key tip.

In Figs. 3 and 4 are shown side and edge views respectively of a key stem 35 having a tenon or pilot 36 with undercut recesses 37. This tenon or pilot 36 is the same as what is commonly known as a dovetail. The top of the dovetail 36 has a concave surface 38 to conform with the convex surface 33 of the recess 31. The main body of the key stem 35 is wider than the top of the dovetail 36 thus forming shoulders 39.

The first step in the process of assembling the key tip shown in Fig. 1 on the stem shown in Fig. 3, is to heat the entire stem 35 to a predetermined temperature after which the dovetail or tenon 36 is inserted into the recess 31 until the tip of the projection 32 contacts the shoulders 39, as shown in Figs. 5 and 6.

The next step in the process is to retain the key tip 30 and key stem 35 in the relationship shown in Figs. 5 and 6 until the heated key stem plasticizes or softens the projections 32 and that portion of the key tip 30 immediately surrounding the recess 31.

After the tip 30 and stem 35 have been retained in the relative position shown in Figs. 5 and 6, the dovetail 36 is pressed into the recess 31 until the shoulders 39 of the stem 35 contact the bottom edge 40 of the key tip 30.

During the last step of the process just described the softened or plasticized projections 32 are forced into the recesses or undercuts 37 and completely fill up the recesses as shown at 41 in Fig. 7.

The assembled keys, comprised of the tip 30 and stem 35, are then allowed to cool, and as they cool the previously plasticized portion of the key tip solidifies, thus permanently locking the key tip 30 to the key stem 35 and forming a unitary key.

The length of the dovetail 36 is such that when the bottom edge 40 of the key tip strikes the shoulders 39 there will be a slight clearance indicated at 42 (Fig. 7) between the concave surface 38 of the dovetail 36 and the convex surface 33 of the recess 31. The provision of this clearance 42 insures that the top of the key tips will always be substantially the same distance from any selected locating point on the stem 35.

As a matter of providing an extra factor of safety, the dovetail 36 may be scored on the sides as indicated in Figs. 8 and 9 to form undercut recesses 45. When the dovetail is thus scored the plasticized material around the recess 31 in the key tip 30 flows into those recesses 45, as indicated at 46 (Fig. 10).

In Figs. 11 to 18 are shown modified forms of key tips and key stems, which may be used without in any way departing from the spirit or scope of this invention.

In Figs. 11 and 12 a key tip 49 is shown with a circular recess 50 having a convex bottom, and adjacent this recess 50, on the bottom of the tip 49 is a circular flange 51. This particular type of key tip shown in Figs. 11 and 12 is adapted to be assembled, by means of applicant's novel method, on a key stem such as that shown in Figs. 13 and 14 wherein the main body 52 of the stem may be cylindrical in shape and the dovetail itself may also be in the form of an inverted cone 53 formed by an undercut recess 54.

When using this type of key stem 52, during the final step of the process of assembling, the bottom 55 of the key tip 49 in Fig. 11 by its contact with the shoulder 56 forms the stop for the insertion of the tenon 53 in the recess 50.

In this particular instance the entire flange 51 becomes plasticized by the heat given off by the heated stem 52 and its tenon 53 so that when the tenon is finally pressed into the recess 50 until the bottom 55 of the tip strikes the shoulder 56 the circular flange 51 will have flowed or drifted into the circular undercut 54 and completely filled the same, thus positively locking the key tip to the stem 52.

Figs. 15 and 16 illustrate a square key stem 60 having a square tenon 61 undercut on all four sides to form recesses 62. On this type of a key stem is adapted to be assembled, by applicant's novel process, a key tip 65 as shown in Figs. 17 and 18, which key tip is provided with a square recess 66 and a square flange 67, immediately adjacent the recess 66. The bottom of the recess 66 is convex and the top of the tenon 61 (Fig. 16) is concave.

When this key 65 is assembled on the stem 60, the bottom 68 of the key tip 65 strikes the shoulder 69 on the key stem thus positively locating the height of the top of the tip from the shoulder 69 and as this last step in the process is being accomplished the square flange 67 having become plasticized through the heat given off by the stem 60 flows or drifts into all four of the recesses 62 formed by undercutting the tenon 61.

From the above description it will be perfectly clear that key tips made of plastic material of various shapes and designs may be assembled on key stems of metal of various shapes and designs by means of applicant's new process and that such keys when assembled will all be uniform, that is, the heights of the key tops or in other words the distance from the top of the key tip to any determined point on the key stem, will always come substantially the same, so that variations in height of keys assembled on a common keyboard will be practically negligible.

While the herein described method or process is set forth as specifically applied to the manufacture of keys for calculating machines, cash registers and typewriters, it is obvious that it may be employed in the production of other articles of manufacture.

Therefore to further illustrate the adaptability of applicant's process for manufacturing articles other than keys, in Fig. 19 is shown a table or kitchen knife the blade and shank of which are metal and the handle is plastic material.

The blade 75 has a shank or tenon 76 with undercut recesses 77 and may or may not, as desirable be scored to form recesses 78.

The handle 80 (Fig. 20) has a recess 81 to receive the shank 76 and has projections 82.

When manufacturing such an article of the type shown in Fig. 19, the shank 76 is heated to a predetermined temperature after which it is inserted into the recess 81 until the projections 82 contact shoulders 83. The parts are held in such relationship until the heated shank softens the projections 82 and also the walls or sides of the recess 81 after which the shank is pressed into the recess until the shoulders 83 contact the handle proper. During this latter movement of the shank into the recess the shoulders 83 force the softened projections 82 into the recesses 77 and the softened walls of the recess 81 flow into the recesses 78, where such are provided, thus permanently keying the handle 78 to the knife blade.

While the forms of the invention herein shown and described are admirably adapted to fulfill the objects primarily stated, it is to be understood that it is not intended to confine the invention to the forms of embodiment herein disclosed for it is susceptible of embodiment in various forms all coming within the scope of the claims which follow.

What is claimed is:

1. The method of manufacturing keys having a tip and a stem, said tip having a recess and projections adjacent thereto, said stem having a tenon with undercut sides the widest portion of the tenon fitting the recess in the tip; including the step of heating the stem; then inserting the tenon into the recess in the tip until the projections touch the shoulder of the stem formed by the making of the tenon; then retaining the tip and stem in such relationship until the heat from the stem plasticizes the projections and portion around the recess of the tip; then pressing the tip on the tenon until the bottom of the tip rests upon the shoulder of the stem, such pressing of the stem forcing the plasticized projections into the undercut sides of the tenon thus permanently locking the tip to the stem.

2. The method of manufacturing keys having a tip made of plastic material and having a recess in the bottom thereof and projections adjacent the recess, and a stem with a tenon having undercut recesses; including the step of heating the stem; then pressing the tip part-way on the stem; then retaining the tip and stem in such relationship until the heated stem softens the projections on the tip; then further pressing the tip on the tenon to force the softened projections on the tip into the undercut recesses of the tenon.

3. The method of manufacturing keys having a tip made of material adapted to be reduced to a state of plasticity, said tip having a recess therein and a projection adjacent the recess; and a stem having a projection with an undercut recess therein; including the step of heating the stem; then inserting the projection of the stem into the recess in the tip until the main body of the stem contacts the projection on the tip; then retaining the tip and stem in such relationship until the heated stem plasticizes the projection on the tip; then pressing the projection on the stem further into the recess in the tip until the main body of the stem contacts the main body of the tip to force the plasticized projection on the tip into the undercut recess in the projection on the stem.

4. The method of manufacturing an article comprising a metal key stem having a tenon with a plurality of undercut recesses, and a key tip having the quality of being reduced to a state of plasticity upon the application of heat thereto, and having a recess and projection adjacent to such recess; including the step of heating the metal key stem to a predetermined temperature; then partially inserting the tenon thereof into the recess of the tip; then retaining the tip and the stem in such relationship until the heat from the stem plasticizes the projection and the central portion of the tip; then wholly inserting the tenon of the stem into the recess while the projection and central portion of the tip are in a state of plasticity thus causing such plasticized portion to flow into the recesses of the tenon to unite the tip and stem into a unitary structure.

5. An article of manufacture made from plastic material and having a recess with a pair of projections adjacent thereto, one side of each projection being a continuation of the adjacent edge of the recess.

6. An article of manufacture made from plastic material and having a recess with a flange adjacent thereto, one side of the flange being a continuation of the adjacent edge of the recess.

ALFRED W. GARDES.